E. BROWN AND A. CARRARD.
METHOD AND APPARATUS FOR REGULATING CENTRIFUGAL COMPRESSORS.
APPLICATION FILED JAN. 26, 1920.
1,401,668.
Patented Dec. 27, 1921.
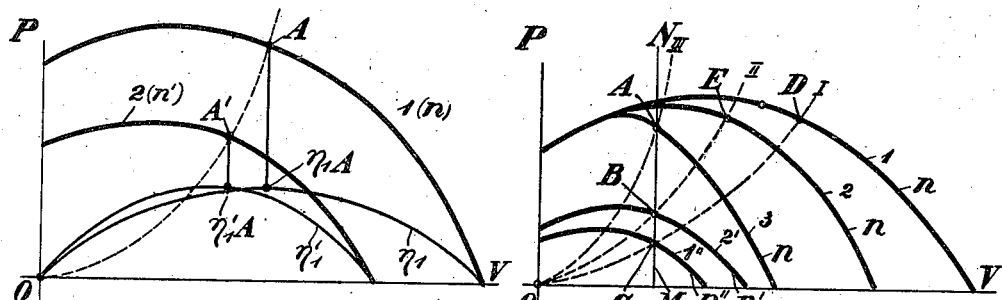
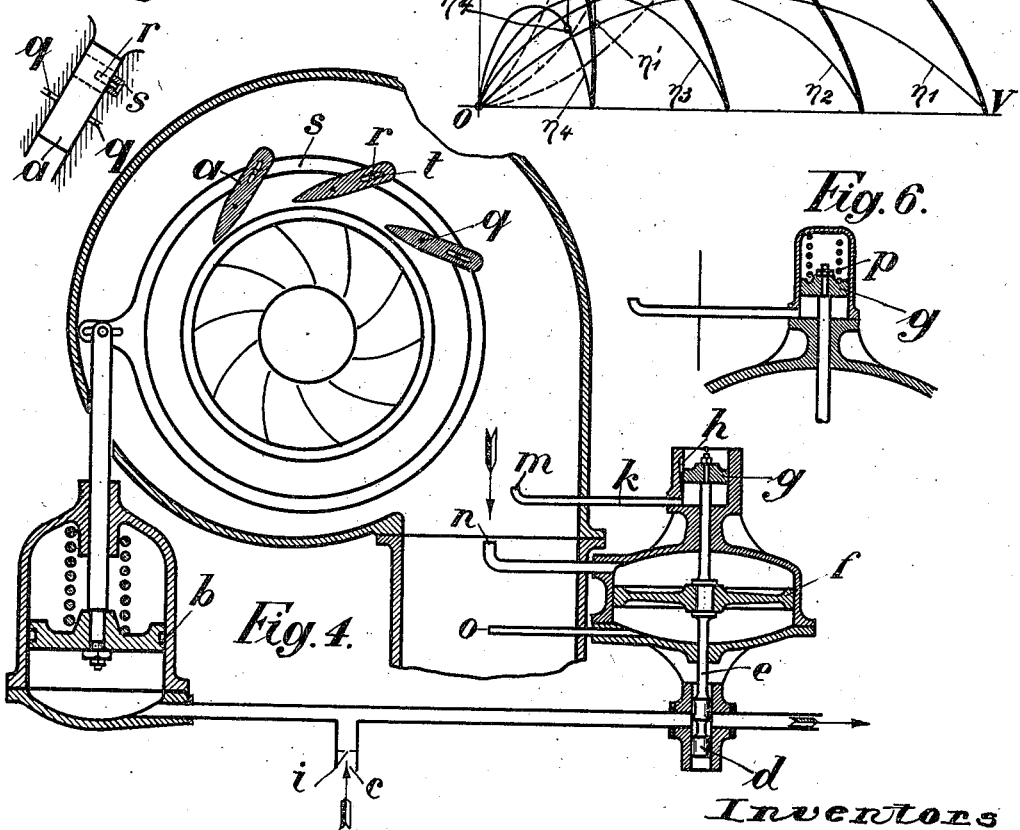
Inventors
E. Brown & A. Carrard
By H. R. Kerslake
Atty.

UNITED STATES PATENT OFFICE.

ERIC BROWN, OF BADEN, AND ALFRED CARRARD, OF ENNETBADEN, SWITZERLAND, ASSIGNORS TO AKTIENGESELLSCHAFT BROWN, BOVERI AND CIE., OF BADEN, SWITZERLAND.

METHOD AND APPARATUS FOR REGULATING CENTRIFUGAL COMPRESSORS.

1,401,668. Specification of Letters Patent. Patented Dec. 27, 1921.

Application filed January 26, 1920. Serial No. 354,296.

*To all whom it may concern:*

Be it known that we, ERIC BROWN, a British subject, residing at Baden, Switzerland, and ALFRED CARRARD, of Ennetbaden, Switzerland, a citizen of the Swiss Republic, have invented certain new and useful Improvements in Methods and Apparatus for Regulating Centrifugal Compressors, of which the following is a specification.

This invention relates to the regulation of centrifugal compressors of the type which utilize adjustable guide blades and has for its object the provision of a method by which regulation may be effected in such a way as to give the maximum possible efficiency of the compressor under all conditions.

If a turbo-compressor be examined on the testing bed in a well known manner by attaching a throttling slide instead of a pressure pipe to the exhaust branch, then for two speeds $n_1$ and $n_2$ with the same slide aperture, as is well known, $$V_1 : \sqrt{h_1} = V_2 : \sqrt{h_2} \text{ or } V_1^2 : V_2^2 = h_1 : h_2$$

where $V_1$ and $V_2$ are the different volumes and $h_1$ and $h_2$ the pressures.

The amounts delivered for the same wheel are in proportion to its speed:

$$V_1 : V_2 = n_1 : n_2$$

and hence $$h_1 : h_2 = n_1^2 : n_2^2,$$

that is, the amounts delivered increase with the first power of the speed, but the pressures with the square of the same. Points of intersection of several pressure-volume curves for different speeds of the compressor and the curve of counter pressure set up by the throttling slide are termed "similar points."

In the drawings:—

Figure 1 is a diagram representing two pressure volume curves with their corresponding efficiency curves for two different speeds, and a counter pressure curve intersecting the pressure volume curves.

Fig. 2 shows a series of pressure volume curves, and their corresponding efficiency curves for a compressor working at constant speed but with varying positions of the adjustable guide blades, and curves of counter-pressure.

Fig. 3 shows a series of pressure volume curves for a given speed and two further pressure volume curves in which the speed of the compressor is adjusted for constant volume at the working point.

Fig. 4 shows diagrammatically an apparatus illustrating an application of the invention wherein a by-pass is used for regulating the effect of the compressor output or the adjustment of the guide blades.

Fig. 5 is an enlarged view of a guide blade showing its method of setting.

Fig. 6 is a modification wherein the function of the by-pass of Fig. 4 is performed by resilient means.

In the graphic representation of the working of centrifugal compressors in pressure volume-curves it is well known that similar points are caused by variations in the speed of revolution to move in parabolas that have their apex in O (see the dotted curve in Fig. 1). At a speed of revolution $n$ let A be a working point or point of intersection of the pressure volume curve 1 with the counter pressure curve OA. On the pressure volume curve 2 for a speed of revolution $n'$ there will be a working point A' on the same counter-pressure curve. If the latter is a parabola passing through O, then A' will be a similar point to A, and both points will have a maximum efficiency corresponding for instance to the respective speed of revolution (these efficiencies will be $\eta'A$ and $\eta'1A$ on the efficiency curves $\eta^1$ and $\eta'1$. These efficiency curves are determined in the testing shop for their corresponding pressure volume curves.

Further from our earlier application for a British patent dated 9 September 1919 and numbered 22,174, it is found that for a given speed of revolution, in closing the guide blade apertures, the pressure volume-curves according to Fig. 2 having the shape 1 will vary and become gradually steeper according to the curves 2, 3, 4, etc. In such a case the corresponding efficiency varies according to the curves $\eta_1, \eta_2, \eta_3, \eta_4$.

If the counter-pressure curve is a parabola OA, then the maximum efficiency will be attained with the position 1 of the guide wheel. If on the contrary the counter-pressure curve is a parabola OC, then the best efficiency will be attained with the position 3 of the guide blades. The position 1 would already be in the neighborhood of the unstable delivery, even if the delivery were stable, and an efficiency of only $\eta'_1$ could be attained at the working point C'. In position 4 the working point C'' is obtained low down on the downward branch: the corresponding efficiency $\eta_4$ would be bad. From this it follows that for each counter-pressure curve a given position of the guide blades will produce the maximum possible efficiency.

Since the previously mentioned counter-pressure curves are parabolas passing through O, this unaltered position is still the best even with varying speed of revolution, because the counter-pressure curve is at the same time the curve of similar points.

For other forms of the counter-pressure curve the effect is the same, but in such cases care must be taken that the position of the guide blades shall no longer be made dependent upon the counter-pressure curve but upon the parabola of similar points.

The nature of the improved method consists in varying the adjustment of the guide blades according to the above stated way, that is to say, in such a manner that in each case the best possible efficiency is attained irrespectively of the speed of the compressor.

The speed of the compressor may for instance be adjusted automatically for constant volume (Fig. 3, line MN). If we consider the counter-pressure curves O I, O II and O III, then for a speed of revolution $n$ for instance, the points D, E, A (analogously to the points A, B, C of Fig. 2) are the working points with at all times the best positions of the guide blades. The position of the guide blades remains constant along the counter-pressure curve. Therefore if we adjust the speed of revolution for constant volume, as above mentioned, then the working points will be C, B, A, in which case the guide blades will have the same positions each time in D and C, in E and B, and in A and A. The speed of revolution is then different in A, B and C, and is smallest in C.

Fig. 4 illustrates an example of a preliminary adjusting mechanism which by means of a power-piston $b$ adjusts the position of the diffusers $a$ in dependence upon the parabolas I, II, III (Fig. 3), and maintains the said position constant along a parabola. The guide blades or diffusers $a$ are rotatably mounted on the one hand by journals $q$ (Fig. 5) and on the other hand they rest on a bolt $r$ which is fixed to a rotatable ring $s$ and extends into a slot $t$ of the blade. The ring $s$ is moved by the power piston $b$, the position of which is determined by the slide $d$.

The pressure under the piston $b$ is adjusted with the help of the position of the opening slide $d$ which allows the oil pressure entering in $c$ and throttled in $i$ by a diaphragm to have access to the atmosphere, or throttles said oil pressure more or less. To a given position of the slide $d$ there belongs a given oil pressure under the piston $b$, and consequently a determined position of this piston as well as of the guide blades. The position of $d$ is adjusted by means of the rod $e$ which is simultaneously influenced by a "volume-piston" $f$ and a pressure piston $g$. In the pipe $m$ leading to the latter, there is interposed a diaphragm $k$ as a throttling device. $h$ is a bypass which leads around the pressure piston $g$, and has a different cross section passage area for each position of the piston. For a given position, we have equilibrium between $f$ and $g$. This equilibrium is maintained along a parabola through O, because the air pressure acting upon the piston $f$ as well as upon the piston $g$, increases with the square of the delivery (law of proportionality). If however the counter-pressure curve should vary for instance from I to II (Fig. 3), the pressure at equal delivery will be greater, and the spindle $e$ will move upward. At this higher position of the piston the cross sectional area of the bypass $h$ is greater and the pressure under the piston $g$ will be less effective on account of the throttling at $k$. The result of this will be a new position of equilibrium and a different position of the slide $d$, that is to say, a different position of the guide blades. Hence it will be seen that the pressure under the piston $g$ is partly proportional to the final pressure of the compressor and at the same time partly dependent on the relative play of the by-pass $h$ and the diaphragm $k$. By suitably selecting the shape of the slot, the correct position of the guide blades can be obtained for each counter-pressure curve. L is the delivery pipe of the centrifugal compressor; $m$ is the connecting pipe leading to the pressure piston $g$; $n$ and $o$ are the pipes leading to the "volume piston" $f$, $n$ indicating the total energy and $o$ the static energy.

Fig. 6 illustrates an arrangement similar to Fig. 4, but with the difference that the bypass $h$ and the diaphragm $k$ are replaced by a spring $p$. Let us assume that for a given counter-pressure parabola I (Fig. 3) for instance all three forces, that is to say, the spring, the pressure-piston and the "volume piston" are in equilibrium. For another parabola for instance, with constant volume, the pressure under the pressure-piston is higher (parabola II); the spindle $e$ moves up; but the power of the spring increases; and a new position of equilibrium is thereby established. By correct shaping of the regulating slide $d$, the desired position of the guide blades can be obtained also with this arrangement. Hence according to the invention the position of the guide blades will change automatically as the counter pressure curve varies from parabola to parabola in such a manner that at all working points work will be done with the smallest possible expenditure of energy of the compressor.

What we claim is:—

1. A regulator for a centrifugal compressor of the type regulated by adjustable guide blades, including a cylinder and piston mechanism for adjusting said guide blades, and automatic means for operating said piston in said cylinder, said means being energized simultaneously by both the pressure and the volume of the fluid delivered by said compressor.

2. A regulator for a centrifugal compressor of the type regulated by adjustable guide blades, and automatic means including a cylinder and piston for adjusting said guide blades in accordance with the output of said compressor, characterized by the feature that said automatic means is controlled by a preliminary adjusting mechanism which is dependent for its operation on both the pressure and the volume of the compressor delivery, said preliminary adjusting mechanism including a cylinder containing a piston actuated by the pressure of the compressor, a cylinder containing a piston actuated by the volume of the delivery of the compressor, pipes connecting said cylinders with the exhaust orifice of the compressor, a fixed constriction in a pipe connecting the said pressure piston with the exhaust orifice of the compressor and a passage of variable area of cross section past said pressure piston for coacting with said fixed constriction, both pistons of the preliminary adjusting mechanism being mechanically fixed together and coacting with a valve in a pipe connecting the cylinder of the first mentioned automatic means with a source of energy.

In testimony whereof we have signed our names to this specification.

ERIC BROWN.
A. CARRARD.